(12) United States Patent
Yajima et al.

(10) Patent No.: US 7,476,861 B2
(45) Date of Patent: Jan. 13, 2009

(54) PASSENGER DETECTION APPARATUS

(75) Inventors: Hiroyuki Yajima, Chiba (JP); Mitsuyoshi Ito, Chiba (JP)

(73) Assignee: Matsuda Micronics Corporation, Kashiwa - Shi (JP)

( * ) Notice: Subject to any disclaimer, the term of this patent is extended or adjusted under 35 U.S.C. 154(b) by 0 days.

(21) Appl. No.: 11/339,828

(22) Filed: Jan. 26, 2006

(65) Prior Publication Data
US 2006/0180764 A1   Aug. 17, 2006

(30) Foreign Application Priority Data
Jan. 28, 2005   (JP)   ............... 2005-022048

(51) Int. Cl.
*G01J 5/00*   (2006.01)

(52) U.S. Cl. ............... 250/338.1; 250/DIG. 1; 250/336.1; 250/338.3; 280/735; 280/734

(58) Field of Classification Search ............ None
See application file for complete search history.

(56) References Cited

U.S. PATENT DOCUMENTS

| | | | | |
|---|---|---|---|---|
| 5,330,226 | A * | 7/1994 | Gentry et al. ............... | 280/735 |
| 5,482,314 | A * | 1/1996 | Corrado et al. ............. | 280/735 |
| 6,485,081 | B1 * | 11/2002 | Bingle et al. ................ | 296/76 |
| 6,552,345 | B2 * | 4/2003 | Asano et al. ................ | 250/342 |
| 6,828,559 | B2 * | 12/2004 | Griffin et al. ............... | 250/349 |
| 6,961,443 | B2 * | 11/2005 | Mahbub ..................... | 382/100 |
| 2005/0077469 | A1 * | 4/2005 | Kaushal ..................... | 250/330 |
| 2006/0004504 | A1 * | 1/2006 | Bouladian ................... | 701/45 |

(Continued)

FOREIGN PATENT DOCUMENTS

JP   11-198705   7/1999

(Continued)

OTHER PUBLICATIONS

"Thermopile Infrared Sensor" by Roithner Lasertechnik; www.roithner-laser.at/All_Datasheets/Thermopile/TP338x.pdf ; last modified Feb. 6, 2003, p. 1.*

(Continued)

*Primary Examiner*—David P Porta
*Assistant Examiner*—Yara B Green
(74) *Attorney, Agent, or Firm*—Kratz, Quintos & Hanson, LLP (57) ABSTRACT

A passenger detection device that determines whether a passenger sits in a passenger seat or backseat, and if YES, determines whether the passenger is an adult or a child, and whether the passenger is sitting in a normal attitude. A pair of thermopile sensors 13 and 14 are disposed on a dashboard 11 at a predetermined distance from each other in a horizontal direction. The pair of thermopile sensors 13 and 14 are disposed such that they monitor a predetermined same position P on a surface of the passenger seat 12 when a passenger 15 does not sit in a passenger seat 12. Output signal which are output from the pair of thermopile sensors 13 and 14 are subtracted by a subtraction circuit 25, an output difference signal of the pair of thermopile sensors 13 and 14 is taken out, and it is detected whether a passenger sits in the seat by this signal.

7 Claims, 3 Drawing Sheets

U.S. PATENT DOCUMENTS

2008/0004776 A1 * 1/2008 Luo et al. .................... 701/45

FOREIGN PATENT DOCUMENTS

| | | |
|---|---|---|
| JP | 2002-234415 | 8/2002 |
| JP | 2002-255010 | 9/2002 |
| JP | 2004-284425 | 10/2004 |

OTHER PUBLICATIONS

Pak, Soo-Jin, et al. "Recent Developments in Thermopile Technology and Applications"; Optoelectronics Artice, optoelectronics.perkinelmer.com; copyright 2004, p. 5.*

* cited by examiner

PASSENGER DETECTION APPARATUS

TECHNICAL FIELD

The present invention relates to a passenger detection apparatus for detecting whether a passenger sits in a passenger seat or backseat other than a driver's seat in a vehicle such as a passenger car having an air bag apparatus.

BACKGROUND TECHNIQUE

An air bag apparatus is disposed in front of a driver's seat or a passenger seat or disposed on the side of the driver's seat or the passenger seat to moderate an impact that a passenger receives at the time of collision of an automobile. An acceleration sensor operates upon reception of an impact received when the automobile collides, and an air bag is operated to protect the passenger from the impact of the collision. This air bag apparatus is mounted on the assumption that an adult sits on the seat, and since an adult usually sits on the driver's seat, the air bag of the driver's seat may be operated automatically when receiving an impact of collision of the automobile.

However, a passenger does not necessarily sit on the passenger seat or the backseat. In such a case, it is not only useless to operate the air bag of the passenger seat or the backseat at the time of collision, but it can be dangerous because pressure is applied to the driver from the side or behind in some cases. Further, a child sits in the passenger seat or the backseat in some cases. In such a case, this is dangerous because the operated air bag may strongly hit his or her face, and it is desirable not to operate the air bag in some cases.

Even with a seated passenger, when the sitting position deviates from a normal sitting position such as when the passenger is sleeping or crouches forward, it is preferable that the air amount for the air bag is reduced or the air bag is not operated.

Therefore, in a vehicle such as a passenger car having an air bag apparatus, it is proposed to detect whether a passenger sits in the passenger seat or backseat, and whether the sitting state is normal, and to control the operation of the air bag apparatus in accordance with the detected information.

To detect whether a passenger is sitting in a seat of an automobile, there are conventionally proposed a structure in which a weight sensor is disposed in a seat portion of a passenger seat, and the weight when a passenger sits on the passenger seat is detected (see patent document 1, for example); a structure in which it is determined whether a child seat is mounted on a seat based on detection results of a sitting sensor incorporated in a seat surface of a seat; latch detection means for detecting whether a seat belt of a seat is latched, and using amount detection means for detecting the using amount of the seat belt, and which can clearly distinguish a case in which an adult is sitting in the seat and a case in which a child seat is mounted (see patent document, 2 for example); a structure in which a seat is provided at its substantially front surface with a sensor using a pyroelectric infrared radiation detector which senses a human body temperature of a passenger in non-contact manner, and it is detected whether there is a passenger on the seat by means of an output signal of the sensor (see patent document 3, for example); and a structure in which a plurality of antenna electrodes are embedded in a seat back of an automobile, electric field generating means for generating electric field are provided around the antenna electrode, and if a passenger sits in the seat, current flowing through the antenna electrode from the electric field generating means is increased allowing detection that a human body has approached the antenna electrode, and in which a detected combined pattern is compared with a previously stored pattern, and it is determined whether there is a passenger sitting in the seat and the physique of the passenger is also determined (see patent document 4, for example).

[Patent document 1] Japanese patent Application Laid-open No. 2004-284425((0010), (0025), FIG. 1 and the like)

[Patent document 2] Japanese patent Application Laid-open No. 2002-255010((0013) to (0014), FIGS. 1 and 2, and the like)

[Patent document 3] Japanese patent Application Laid-open No. 2002-234415((0001) to (0016), FIGS. 1 to 4, and the like)

[Patent document 4] Japanese patent Application Laid-open No. H11-198705((0017) to (0024), FIGS. 1 to 5, and the like)

According to the method of the patent document 1 using the weight sensor, since the weight sensor is operated also when baggage is put on a passenger seat or backseat, it is impossible to distinguish whether a passenger is sitting in a seat or baggage is put on the seat. Therefore, it is determined that a passenger is sitting in the seat also when a baggage is put on the passenger seat or backseat, the air bag is operated uselessly, and there is a danger that a passenger may lose his or her hearing ability due to abrupt expansion of the operated air bag, the air bag may strongly hit the passenger's face and may lose his or her sight. Further, when the sitting position is deviated from the weight sensor or when an infant sits in the child seat, the weight sensor does not detect the passenger in some cases. In such a case, it may adversely be determined that no passenger sits in the seat.

According to the method of the patent document 2 using both the sitting sensor and the seat belt detection, a passenger can not be detected correctly when the seat belt or the child seat is not used. When baggage is secured using the seat belt, there is an adverse possibility that the baggage is erroneously recognized as a passenger, and the air bag may be operated uselessly.

According to the method of the patent document 3 for detecting whether there is a seated passenger on the seat using the output signal of the pyroelectric infrared radiation detector sensor, the pyroelectric infrared radiation detector sensor is used, and the temperature variation is detected when a passenger gets on or off, and if a seated passenger slowly gets on or off, or if a seated passenger remains at rest, the pyroelectric infrared radiation detector sensor can not clearly detect a difference between a temperature of the passenger and a room temperature which is a background temperature.

According to the method of the patent document 4 for detecting approach of a human body using the antenna electrodes, the electric field generating means for generating electric field around the antenna electrodes is required, this complicates the structure, and there is an adverse possibility that the passenger detection apparatus is erroneously operated by an electric field from outside of the automobile and by an electric field from various electronic control devices in the automobile.

DISCLOSURE OF THE INVENTION

Hence, it is an object of the present invention to solve these problems, and to provide a passenger detection apparatus capable of reliably determining whether a passenger sits in a passenger seat or backseat, whether the passenger sitting in the seat is an adult or a child, and whether the passenger is sitting with normal attitude.

It is another object of the invention to provide a passenger detection apparatus capable of reliably determining whether a passenger is sitting in a passenger seat or backseat or baggage is put on the passenger seat or backseat.

It is another object of the invention to provide a passenger detection apparatus capable of reliably detecting that a passenger is sitting in a seat even if the passenger or baggage remains at rest and there is no temperature variation.

It is another object of the invention to provide a passenger detection apparatus capable of detecting that a passenger is sitting in a seat, with a simple structure without exerting an influence upon various electronic control devices in an automobile.

A first aspect of the invention provides a passenger detection apparatus for detecting whether a passenger is sitting in a seat of a vehicle, comprising a pair of thermopile sensors disposed in a horizontal direction at a predetermined distance from each other, and a subtraction means for taking out an output difference of detection values which are output from the pair of thermopile sensors, wherein the pair of thermopile sensors are disposed such that the thermopile sensors monitor a predetermined same position of the seat or around the seat when the passenger does not sit in the seat.

According to a second aspect of the invention, in the passenger detection apparatus of the first aspect, the pair of thermopile sensors comprise a plurality of thermopile devices arranged in array consisting a plurality of rows and a plurality of columns.

According to a third aspect of the invention, in the passenger detection apparatus of the second aspect, a monitoring region of the thermopile devices of one of the thermopile sensors and a monitoring region of the thermopile devices of the other thermopile sensor are the same or overlapped on each other in a position of a background object.

According to a fourth aspect of the invention, in the passenger detection apparatus of the second aspect, it is distinguished whether the passenger is an adult or a child, and the passenger and baggage are distinguished by means of the output difference of the columns in array of the thermopile devices.

According to a fifth aspect of the invention, in the passenger detection apparatus of any one of the first to third aspects, the passenger and the baggage are distinguished depending on fluctuation in output of the pair of thermopile sensors.

According to the present invention, since an output difference of detection values output from the pair of thermopile sensors is detected, variation of background temperature such as a seat in the automobile can be offset. Therefore, even if the temperature in the automobile is abruptly varied, it is possible to determine whether a passenger sits in the passenger seat or backseat, and if Yes, it is possible to reliably distinguish whether the passenger is an adult or a child, and whether the passenger is sitting in a normal attitude.

Since the pair of thermopile sensors comprise a plurality of thermopile devices arranged in array consisting a plurality of rows and a plurality of columns, it is possible to distinguish whether the passenger is an adult or a child, and a passenger and a baggage can be distinguished by means of the output difference of the columns.

The passenger and the baggage can be distinguished depending upon presence or absence of fluctuation of outputs of the pair of thermopile sensors.

Since the thermopile sensors detect a passenger, even if the passenger remains at rest and there is not temperature variation, it is possible to reliably detect that a passenger is sitting in a seat.

It is possible to detect that a passenger is sitting in a seat with a simple structure without exerting an influence upon various electronic control devices in an automobile.

According to the passenger detection apparatus of the first aspect of the present invention, the pair of thermopile sensors disposed at a predetermined distance from each other in the horizontal direction are disposed such that they monitor the same position in a background position when no passenger is sitting in the seat, and an output difference of detection values which are output from the pair of thermopile sensors is detected therefore, the variation of the background temperature such as a seat in the automobile can be offset. When a passenger is sitting in the seat, since the pair of thermopile sensors monitor different positions of the passenger, a temperature difference is generated. Thus, even if the temperature in the automobile is abruptly varied, it is possible to reliably distinguish whether a passenger is sitting in the passenger seat or backseat.

According to the second aspect of the invention, in the passenger detection apparatus of the first aspect, the pair of thermopile sensors comprise a plurality of thermopile devices arranged in array consisting a plurality of rows and a plurality of columns. Therefore, an adult passenger and a child passenger can be distinguished, and a passenger and a baggage can be distinguished by the output difference between the columns.

According to the third aspect of the invention, in the passenger detection apparatus of the second aspect, a monitoring region of the thermopile devices of one of the thermopile sensors and a monitoring region of the thermopile devices of the other thermopile sensor are the same or overlapped on each other in a position of a background object. It is possible to reliably offset the variation of the background temperature by detecting the output difference of the detection values which are output from the thermopile sensors. Thus, even if the temperature in the automobile is abruptly varied, it is possible to reliably distinguish whether a passenger sits in the passenger seat or backseat.

According to the fourth aspect of the invention, in the passenger detection apparatus of the second aspect, the output difference between the columns of the array of the thermopile devices is compared, an adult passenger and a child passenger can reliably be distinguished, and a passenger and baggage can reliably be distinguished.

According to the fifth aspect of the invention, in the passenger detection apparatus of any one of the first to third aspects, fluctuation of outputs of the pair of thermopile sensors is observed, and a passenger and a baggage can be distinguished.

BRIEF DESCRIPTION OF THE DRAWINGS

FIG. 2 are front views showing array structures of thermopile devices of thermopile sensors used in the passenger detection apparatus of the invention, wherein

DESCRIPTION OF PREFERRED EMBODIMENT

An embodiment of a passenger detection apparatus of the present invention will be explained based on the drawings.

Figure 1:
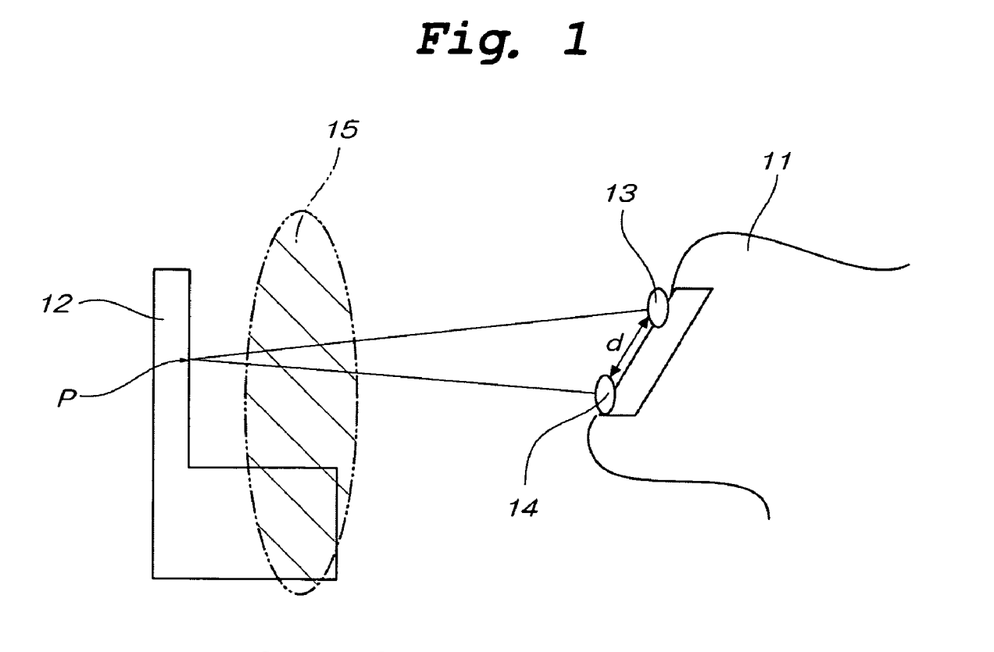
FIG. 1 is a conception diagram showing a basic structure of a passenger detection apparatus of the present invention.

FIG. 1 is a conception diagram showing a basic structure of the passenger detection apparatus of the invention. The following explanation is based on a case in which a passenger sitting in a passenger seat is detected, but the structure is substantially the same even when the passenger sits in a backseat.

A pair of thermopile sensors 13 and 14 are disposed at positions where a dashboard 11 faces a passenger seat 12. The thermopile sensors 13 and 14 are separated from each other at a distance d in a horizontal direction. The thermopile sensors 13 and 14 comprises a plurality of thermopile devices capable of detecting far infrared radiation, and the thermopile devices are arranged in array. Optical axes of the thermopile sensors 13 and 14 are adjusted such that the thermopile sensors 13 and 14 monitor a predetermined region P on a surface of a backrest portion of the passenger seat 12 when a passenger 15 does not sit in the passenger seat 12. When the passenger 15 sits in the passenger seat 12, the thermopile sensors 13 and 14 monitor different positions in a front surface of the passenger 15, and these positions are closer to the thermopile sensors 13 and 14 than a surface of the passenger seat 12.

FIGS. 2 show an example of arrangement of the thermopile devices. To grasp the detecting space as a surface, a plurality of the thermopile devices are arranged in array, i.e., the thermopile devices are arranged in a horizontal axis direction and a vertical axis direction of the surface. FIG. 2(A) shows an example in which four thermopile devices 1a to 1d are arranged in two rows and two columns. FIG. 2(B) shows an example in which five thermopile devices 2a to 2e are arranged in two rows, two columns and one intermediate position. FIG. 2(C) shows an example in which six thermopile devices 3a to 3f are arranged in two rows and three columns. FIG. 2(D) shows an example in which nine thermopile devices 4a to 4i are arranged in three rows and three columns. FIG. 2(E) shows an example in which n×m thermopile devices are arranged in n rows and m columns. The array of the thermopile devices monitors the predetermined regions of the passenger seat 12, i.e., region P in FIG. 1 as a surface.

Figure 2A:
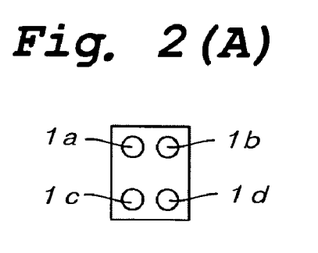
FIG. 2(A) shows an array in which four thermopile devices are arranged in two rows and two columns.
Figure 2B:
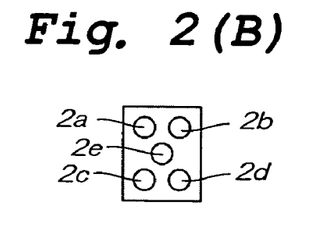
FIG. 2(B) shows an array in which five thermopile devices are arranged.
Figure 2C:
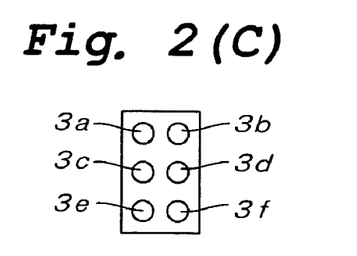
FIG. 2(C) shows an array in which six thermopile devices are arranged in two rows and three columns.
Figure 2D:
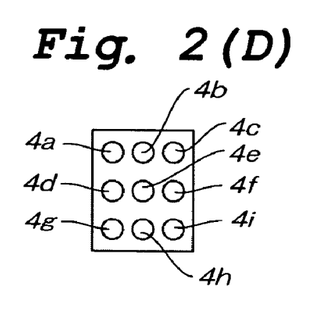
FIG. 2(D) shows an array in which nine thermopile devices are arranged in three rows and three columns.
Figure 2E:
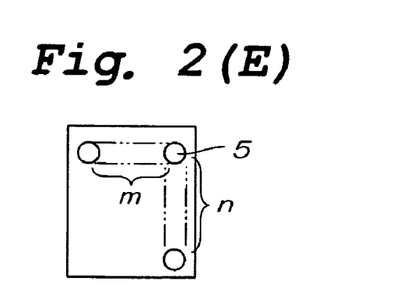
FIG. 2(E) shows an array in which n×m thermopile devices are arranged in n rows and m columns.
Figure 3:
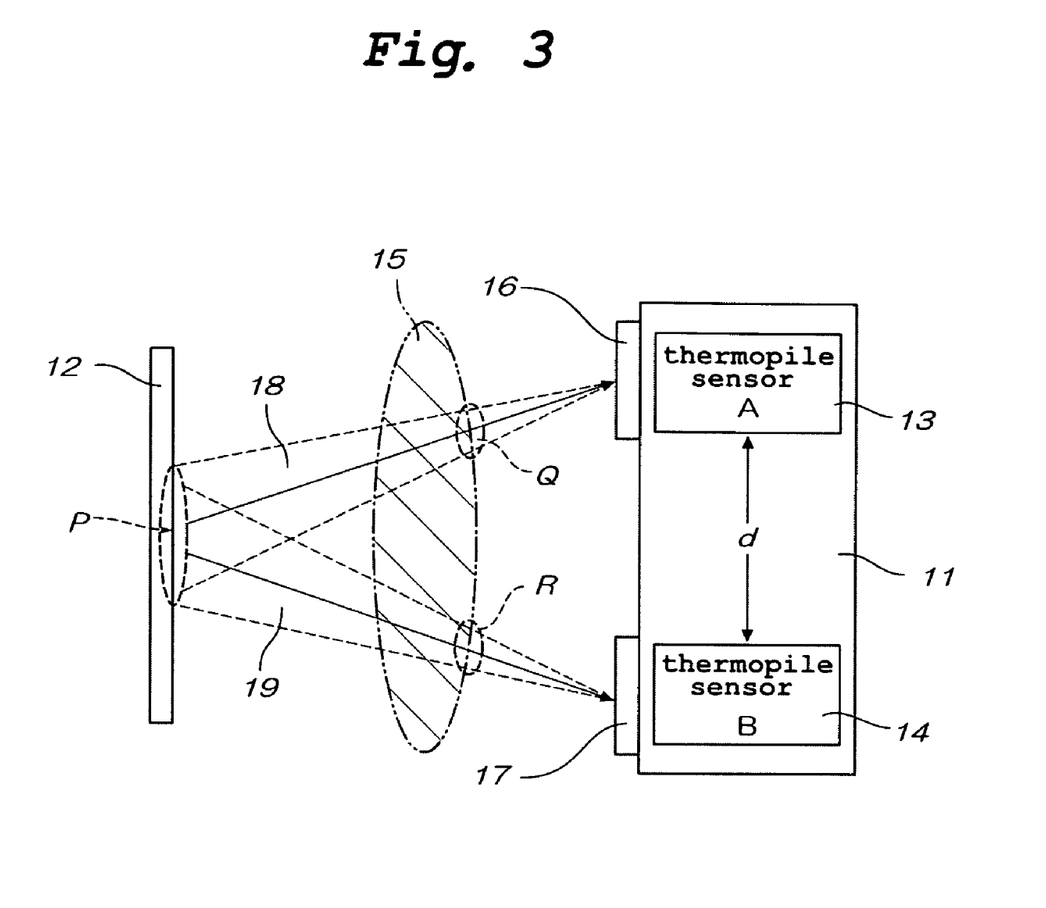
FIG. 3 is a conception diagram of the structure shown in FIG. 1 as viewed from a ceiling of a vehicle.
Figure 4:
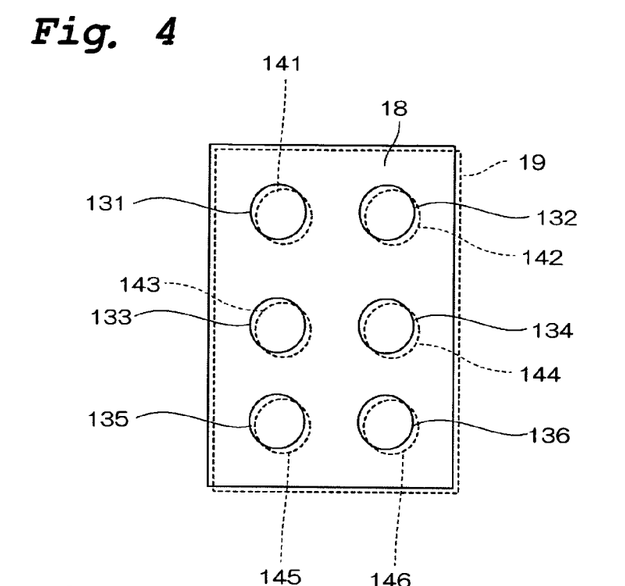
FIG. 4 is a front view used for explaining monitoring regions of a pair of thermopile sensors and monitoring positions of thermopile devices in the passenger detection apparatus of the invention.

FIG. 3 is a block diagram of the structure shown in FIG. 1 as viewed from a ceiling of the vehicle. The same members as those in FIG. 1 are designated with the same symbols, and explanation thereof will be omitted. A mirror 16 is disposed on the optical axis of the thermopile sensor 13, and a mirror 17 is disposed on the optical axis of the thermopile sensor 14. A monitoring region 18 of the thermopile sensor 13 can be changed by changing the angle of the mirror 16. A monitoring region 19 of the thermopile sensor 14 can be changed by changing the angle of the mirror 17. As shown in FIG. 3, the optical axes of the mirrors 16 and 17 are adjusted such that the monitoring region 18 of the thermopile sensor 13 and the monitoring region 19 of the thermopile sensor 14 are superposed or overlapped on each other at the predetermined region P in the surface of the backrest portion of the passenger seat 12. For example, when the six thermopile devices 3a to 3f are arranged in the array consisting of two rows and three columns as shown in FIG. 2(C) as the thermopile sensors 13 and 14, the angles of the optical axes of the mirrors 16 and 17 are adjusted such that the monitoring positions 131 to 136 of the thermopile devices 3a to 3f in the monitoring region 18 of the thermopile sensor 13 and the monitoring positions 141 to 146 of the thermopile devices 3a to 3f in the monitoring region 19 of the thermopile sensor 14 are overlapped on each other as shown in FIG. 4. In this case, the angles of the optical axes are adjusted such that the monitoring positions 131 and 132 by the upper thermopile devices 3a and 3b of the thermopile sensor 13 and the monitoring positions 141 and 142 by the upper thermopile devices 3a and 3b of the thermopile sensor 14 monitor a headrest portion; the monitoring positions 133 and 134 by the intermediate thermopile devices 3c and 3d of the thermopile sensor 13 and the monitoring positions 143 and 144 by the intermediate thermopile devices 3c and 3d of the thermopile sensor 14 monitor an upper portion of the backrest, and the monitoring positions 135 and 136 by the lower thermopile devices 3e and 3f of the thermopile sensor 13 and the monitoring positions 145 and 146 by the lower thermopile devices 3e and 3f of the thermopile sensor 14 monitor a lower portion of the backrest. The angles of the optical axes may be automatically adjusted in synchronization with movement of the seat for example. There is also a method in which the optical axes are automatically adjusted by a backrest surface heater. The optical axes may be adjusted manually of course.

In FIG. 4, to make it easy to understand, the monitoring region 18 of the thermopile sensor 13 shown with solid lines and the monitoring region 19 of the thermopile sensor 14 shown with broken lines are slightly deviated from each other, and the monitoring positions 131 to 136 of the thermopile devices 3a to 3f of the thermopile sensor 13 shown with solid lines and the monitoring positions 141 to 146 of the thermopile devices 3a to 3f of the thermopile sensor 14 shown with broken lines are slightly deviated from each other. However, in the actual case, it is preferable that they are completely superposed or overlapped on each other. Also when the thermopile devices of the thermopile sensors 13 and 14 are arranged in array other than the array of six devices shown in FIG. 2(C), the angles of the mirrors 16 and 17 are adjusted such that the monitoring positions of the thermopile devices in the monitoring region 18 of the thermopile sensor 13 and the monitoring positions of the thermopile devices in the monitoring region 19 of the thermopile sensor 14 are superposed or overlapped on each other.

When the passenger 15 sits in the passenger seat 12 in this state, the monitoring region 18 of the thermopile sensor 13 corresponds to a position Q on the surface of the passenger 15, and the monitoring region 19 of the thermopile sensor 14 corresponds to a position R on the surface of the passenger 15. That is, the thermopile sensor 13 and the thermopile sensor 14 monitor different positions.

Figure 5:
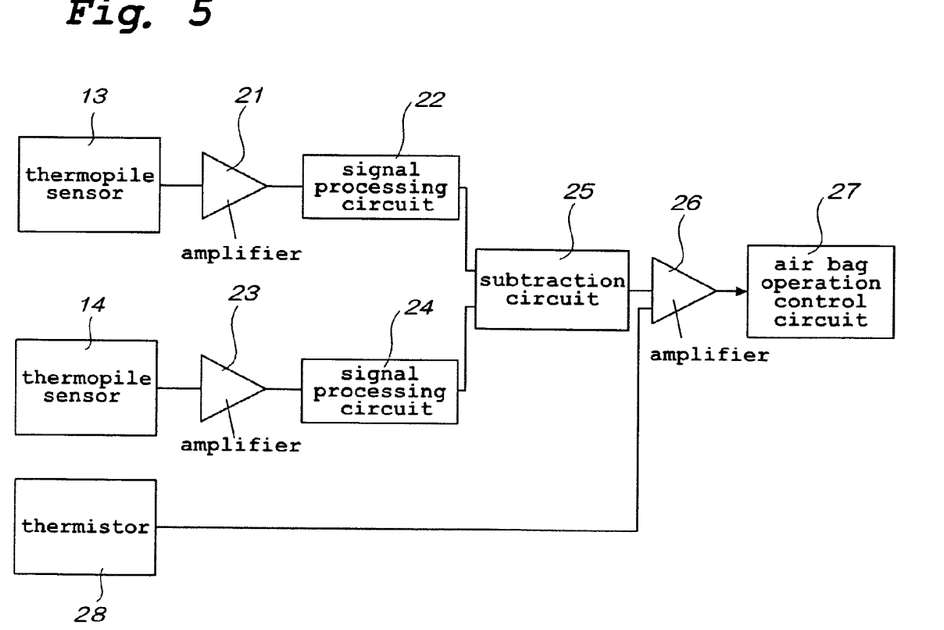
FIG. 5 is a block diagram showing one example of a signal processing circuit of the passenger detection apparatus of the invention.

FIG. 5 is a block diagram showing one example of a signal processing circuit of the passenger detection apparatus according to the present invention. In this example, the six thermopile sensors 13 and 14 shown in FIG. 2(C) are used. The absolute temperature in the monitoring region 18 monitored by the thermopile sensor 13 is taken out as an electric signal of six channels corresponding to the monitoring positions 131 to 136 by the six thermopile devices 3a to 3f shown in FIG. 4. The electric signal is amplified by an amplifier 21 of six channels, and is measured as a temperature signal of six channels by the signal processing circuit 22. Similarly, the absolute temperature in the monitoring region 19 monitored by the thermopile sensor 14 is taken out as an electric signal of six channels corresponding to the monitoring positions 141 to 146 by the six thermopile devices 3a to 3f. The electric signal is amplified by an amplifier 23 of six channels, and is measured as a temperature signal of six channels by the signal processing circuit 24.

Outputs of the signal processing circuit 22 and the signal processing circuit 24 are supplied to a subtraction circuit 25 of six channels. The subtraction circuit 25 subtracts a temperature signal by the thermopile device 3a of the thermopile sensor 14 which is output from the signal processing circuit 24, from a temperature signal by the thermopile device 3a of the thermopile sensor 13 which is output from the signal processing circuit 22. Similarly, the subtraction circuit 25 subtracts a temperature signal by the thermopile device 3b of the thermopile sensor 14, from a temperature signal by the thermopile device 3b of the thermopile sensor 13; subtracts a temperature signal by the thermopile device 3c of the thermopile sensor 14, from a temperature signal by the thermopile device 3c of the thermopile sensor 13; subtracts a temperature signal by the thermopile device 3d of the thermopile sensor 14, from a temperature signal by the thermopile device 3d of the thermopile sensor 13; subtracts a temperature signal by the thermopile device 3e of the thermopile sensor 14, from a temperature signal by the thermopile device 3e of the thermopile sensor 13; and subtracts a temperature signal by the thermopile device 3f of the thermopile sensor 14, from a temperature signal by the thermopile device 3f of the thermopile sensor 13. A subtraction signal of six channels from the subtraction circuit 25 is amplified by an amplifier 26 and supplied to an air bag operation control circuit 27 such as a one-chip microcomputer.

The thermopile sensors 13 and 14 measure absolute temperatures in the monitoring region, but their output signal levels are varied by temperatures of the positions where the thermopile sensors 13 and 14 are disposed. Hence, temperatures of the positions of the thermopile sensors 13 and 14 are measured by a thermistor 28, measured temperature signals by the thermistor 28 are supplied to the amplifier 26, and the subtraction signal of six channels from the subtraction circuit 25 is compensated in temperature. This temperature compensation may be carried out by the signal processing circuit 22 and the signal processing circuit 24.

Next, the action of the passenger detection apparatus of the present invention will be explained with reference to FIGS. 1 to 5.

When the passenger 15 does not sit in the passenger seat 12, a position P on the surface of the passenger seat 12 is a background. As shown in FIG. 4, the thermopile sensor 13 measures a surface temperature of the monitoring region 18 of the passenger seat 12 as a background temperature, and measures a surface temperature of the monitoring region 19 of the passenger seat 12 as a background temperature. The thermopile devices 3a to 3f of the thermopile sensor 13 and the thermopile devices 3a to 3f of the thermopile sensor 14 are arranged in the same manner, and the monitoring regions of the thermopile sensors 13 and 14 are adjusted to be the same by the mirrors 16 and 17. Therefore, the monitoring positions 131 to 136 of the thermopile devices 3a to 3f of the thermopile sensor 13 and the monitoring positions 141 to 146 of the thermopile devices 3a to 3f of the thermopile sensor 14 are overlapped on each other, and the temperatures of the same position of the passenger seat are measured.

The absolute temperature of the passenger seat 12 measured by the thermopile sensor 13 is taken out by the thermopile devices 3a to 3f as an electric signal of six channels corresponding to the monitoring positions 131 to 136, and the electric signal is amplified by the amplifier 21 of six channels, and is measured by the signal processing circuit 22 as a temperature signal of six channels. In the signal processing circuit 22, a difference signal between the signals of various channels and a signal of other channel is calculated and output.

Similarly, the absolute temperature of the passenger seat 12 measured by the thermopile sensor 14 is taken out by the thermopile devices 3a to 3f as an electric signal of six channels corresponding to the monitoring positions 141 to 146, and the electric signal is amplified by the amplifier 23 of six channels, and is measured by the signal processing circuit 24 as a temperature signal of six channels. In the signal processing circuit 24, a difference signal between a signal of one of the various channels and a signal of another one of the channels is calculated and output.

Outputs of the signal processing circuit 22 and the signal processing circuit 24 are supplied to the subtraction circuit 25. The subtraction circuit 25 subtracts the absolute temperature signal of the passenger seat 12 measured by the thermopile sensor 14, from the absolute temperature signal of the passenger seat 12 measured by the thermopile sensor 13. Since the thermopile devices 3a to 3f of the thermopile sensor 13 and the thermopile devices 3a to 3f of the thermopile sensor 14 measure the temperatures of the same positions of the passenger seat 12 as described above, the subtraction output of the signal processing circuit 24 always becomes "zero" irrespective of temperatures of various portion of the passenger seat. Therefore, the output of the amplifier 26 also becomes "zero", and the output of the amplifier 26 always becomes "zero" in a state in which no passenger sits in the passenger seat 12. That is, a signal in a background which is a surface of the passenger seat 12 is recognized as "zero".

Generally, the temperature in the automobile is varied entirely or locally between summer and winter, and morning and daytime, and depending upon a condition of an air-conditioning, daylighting position, and opening and closing of a door, and the temperature is largely varied. Therefore, the background temperatures measured by the thermopile sensors 13 and 14 are also varied largely. However, as described above, the measured value of the background temperature can always defined as "zero" irrespective of background temperature variation by subtracting the background temperature measured by the thermopile sensor 14 from the background temperature measured by the thermopile sensor 13.

Output values of the thermopile sensors 13 and 14 are varied depending upon temperature environments of the thermopile sensors 13 and 14 themselves, and the output values are varied depending upon the temperature condition in the automobile at the time of measurement although the same position is measured. Temperatures of the positions of the thermopile sensors 13 and 14 are measured by the thermistor 28, measured temperature signal thereof is supplied to the amplifier 26, and the subtraction signal from the subtraction circuit 25 is corrected in accordance with temperature variations of the thermopile sensors 13 and 14 themselves.

If a passenger sits in the passenger seat 12, as shown in FIG. 3, the monitoring region 18 of the thermopile sensor 13 becomes the position Q of the surface of the passenger 15, and the monitoring region 19 of the thermopile sensor 14 becomes the position R of the surface of the passenger 15. That is, the thermopile sensor 13 and the thermopile sensor 14 monitor different positions of the passenger 15.

The absolute temperature in the monitoring position Q of the passenger 15 measured by the thermopile sensor 13 is taken out as an electric signal of six channels corresponding to the monitoring positions 131 to 136 by the thermopile devices 3a to 3f, the electric signal is amplified by the amplifier 21, and is measured by the signal processing circuit 22 as a temperature signal of six channels. Similarly, the absolute temperature in the monitoring position R of the passenger 15 measured by the thermopile sensor 14 is taken out as an electric signal of six channels corresponding to the monitoring positions 141 to 146 by the thermopile devices 3a to 3f, the electric signal is amplified by the amplifier 23, and is measured by the signal processing circuit 24 as a temperature signal of six channels. Outputs of the signal processing circuit 22 and the signal processing circuit 24 are subtracted by the subtraction circuit 25. In this case, since the monitoring positions 131 to 136 of the thermopile devices 3a to 3f of the thermopile sensor 13 and the monitoring positions 141 to 146 of the thermopile devices 3a to 3f of the thermopile sensor 14 measure temperatures of different positions of the passenger 15, a difference of measured value exists due to a difference in temperature between the outputs of the thermopile sensors 13 and 14 and thus, the outputs of six channels of the subtraction circuit 25 do not become zero, and a value corresponding to the temperature difference can be obtained. Thus, a value corresponding to the temperature difference is output from the amplifier 26, and from presence or absence of the measured value, it is possible to detect whether the passenger 15 sits.

The output of the amplifier 26 is supplied to the air bag operation control circuit 27, and an air amount for operating the air bag is controlled in accordance with a value of the output.

A temperature difference in the different positions Q and R of the passenger 15 is usually small value because the different positions mean different positions of the same cloth of the same person. Thus, it is preferable that the amplification rates of the amplifiers 21 and 23 are large to certain points.

It is possible to detect a passenger more precisely if the structure of the patent document 1 in which the weight sensor is disposed in the seat portion of the passenger seat 12 to detect the weight of the passenger 15, and the structure of the patent document 2 in which it is detected whether a passenger wears a seat belt are incorporated in the present invention.

When a child sits in the passenger seat 12, it is preferable in some cases that the air bag is not operated as described above. Hence, it is necessary to determine whether the passenger 15 is adult or child. To determine whether the passenger 15 is adult or child, a multi-device in which the thermopile sensors 13 and 14 comprise the plurality of thermopile devices arranged in the array is employed. In this embodiment, the monitoring positions 131 and 132 by the upper thermopile devices 3a and 3b of the thermopile sensor 13 and the monitoring positions 141 and 142 by the upper thermopile devices 3a and 3b of the thermopile sensor 14 monitor the headrest portion; the monitoring positions 133 and 134 by the intermediate thermopile devices 3c and 3d of the thermopile sensor 13 and the monitoring positions 143 and 144 by the intermediate thermopile devices 3c and 3d of the thermopile sensor 14 monitor the upper portion of the backrest, and the monitoring positions 135 and 136 by the lower thermopile devices 3e and 3f of the thermopile sensor 13 and the monitoring positions 145 and 146 by the lower thermopile devices 3e and 3f of the thermopile sensor 14 monitor the lower portion of the backrest.

When the passenger 15 is an adult or a junior high school student having substantially the same physique as adult, the passenger 15 sits in the seat such that the passenger 15 cover all of the headrest portion and the backrest portion due to his or her physique. Therefore, the monitoring regions are the positions Q and R shown in FIG. 3 with respect to all of the thermopile devices 3a to 3f. On the other hand, when a passenger is an elementary school student or lower, since the sitting height is low, the passenger sits in the seat such that the passenger does not cover the headrest portion or an upper portion of the backrest portion in some cases. Therefore, the monitoring regions of the upper thermopile devices 3a and 3b corresponding to the headrest portion, or monitoring regions of the intermediate thermopile devices 3c and 3d corresponding to the upper portion of the backrest portion become not the positions Q and R shown in FIG. 3 but background positions which are a surface of the passenger seat 12. Temperatures of the positions Q and R which are surface positions of the passenger 15, and the background temperature which is a surface of the passenger seat 12 are different from each other, temperature variation of human body is gentle because the temperature is varied due to body heat but the background temperature is relatively abruptly varied by a room temperature environment. The positions Q and R which are surface positions of the passenger 15 are varied with time by motion caused by breathing and variation of attitude of the passenger 15. Further, even if the passenger remains at rest, heat wave of human body is slightly varied and thus, there is fluctuation in the temperature measurement value, but there is almost no fluctuation in the background temperature which is the surface of the passenger seat 12. Therefore, when the output values of the thermopile devices 3a to 3f of the thermopile sensors 13 and 14 are varied due to these differences and the passenger 15 is an adult, an output of six channels can be obtained from the subtraction circuit 25, and when the passenger 15 is a child, only output of 2 to 4 channels can be obtained from the subtraction circuit 25. Thus, it is possible to distinguish whether the passenger 15 is an adult or a child.

When the passenger 15 is a child, since only the output of 2 to 4 channels is output from the subtraction circuit 25, the air bag operation control circuit 27 reduces the air amount for operating the air bag or does not operate the air bag in accordance with the state of the output.

If the weight sensor is also used for the passenger seat 12, it is possible to distinguish an adult and a child more precisely.

When a passenger sits in the passenger seat 12 such that the passenger leans to the right or left such as when the passenger is sleeping, the monitoring region of any of the thermopile sensors 13 and 14 is deviated from the position Q or R which is the surface position of the passenger 15, or positions of the row in the array of the thermopile devices 3a to 3f of the thermopile sensor 13 and the thermopile sensor 14, i.e., monitoring positions of the rows of the thermopile devices 3a, 3c and 3e or thermopile devices 3b, 3d and 3f are deviated from the positions Q and R which are surface positions of the passenger 15 and the positions can be detected. In this case also, if the weight sensor is also used, it is possible to determine more precisely.

When the passenger leans forward, since the distance between the passenger 15 and the thermopile sensors 13 and 14 is shortened, areas of the positions Q and R which are the surface positions of the passenger 15 and the positions of the passenger 15 are varied. With this, outputs of the thermopile sensors 13 and 14 are varied and thus, it is possible to detect the forward leaning state.

In these cases also, the air bag operation control circuit 27 controls such that the air amount for operating the air bag is reduced or the air bag is not operated.

When the passenger 15 does not sit in the passenger seat 12 but puts a baggage on the passenger seat 12, the monitoring regions of the thermopile sensors 13 and 14 become positions Q and R which are different from the background position like the case in which the passenger 15 sits in the passenger seat 12. When the baggage is put on the passenger seat, it is preferable that the air bag is not operated as described above.

Therefore, it is necessary to distinguish whether a passenger sits in the passenger seat 12 or a baggage is put on the passenger seat 12. Like a case in which adult and child are distinguished, it is possible to distinguish depending upon the size by determining whether positions of the monitoring regions of the upper thermopile devices 3a and 3b corresponding to the headrest portion and positions of the monitoring regions of the intermediate thermopile devices 3c and 3d corresponding to the upper portion of the backrest portion are the background position which is the surface of the passenger seat 12. When a baggage has the same size as a passenger, it is possible to distinguish the baggage and the passenger depending upon whether fluctuation exists in the temperatures in the monitoring regions Q and R of the thermopile sensors 13 and 14. In this case also, if the weight sensor is also used, it is possible to distinguish more precisely.

When it is determined that the baggage is put on the passenger seat 12, the air bag operation control circuit 27 controls such that the air bag is not operated.

Although a passenger sitting in the passenger seat is detected in the above explanation, the structure is the same even if the passenger sits on the backseat, and the same effect can be obtained.

Although the thermopile sensors 13 and 14 are disposed on the dashboard 11 in the above explanation, the thermopile sensors 13 and 14 may be disposed on a ceiling surface of the vehicle, and the thermopile sensors 13 and 14 may monitor a passenger on the passenger seat or backseat. In this case, the background may be a different position such as a side door inner surface other than the backrest surface of the seat.

As optical systems of the thermopile sensors 13 and 14, optical systems comprising lenses or a combination of a lens and a mirror may be used instead of the mirrors 16 and 17.

The passenger detection apparatus of the present invention determines whether a passenger sits in a passenger seat or backseat other than a driver's seat of a vehicle such as a passenger car having an air bag apparatus, and when the passenger sits on the seat, it is also determine whether the passenger is an adult or a child, and the passenger detection apparatus operates the air bag apparatus in accordance with the state of the passenger on the passenger seat or backseat.

What is claimed is:

1. A passenger detection apparatus for detecting whether a passenger sits in a seat of a vehicle, comprising a pair of thermopile sensors disposed in a horizontal direction at a predetermined distance from each other, and a subtraction means for taking out an output difference of detection voltages which are output from the pair of thermopile sensors, wherein the pair of thermopile sensors are disposed such that the thermopile sensors monitor a predetermined same position of the seat or around the seat when the passenger does not sit in the seat.

2. The passenger detection apparatus according to claim 1, wherein the pair of thermopile sensors comprise a plurality of thermopile devices arranged in an array consisting a plurality of rows and a plurality of columns.

3. The passenger detection apparatus according to claim 2, wherein a monitoring region of the thermopile devices of one of the thermopile sensors and a monitoring region of the thermopile devices of the other thermopile sensor are the same or overlapped on each other in a position of a background object.

4. The passenger detection apparatus according to claim 2, wherein it is distinguished whether the passenger is an adult or a child, and the passenger and a baggage are distinguished by means of the output difference of the columns in array of the thermopile devices.

5. The passenger detection apparatus according to claim 1, wherein the passenger and the baggage are distinguished depending on fluctuation in output of the pair of thermopile sensors.

6. The passenger detection apparatus according to claim 2, wherein the passenger and the baggage are distinguished depending on fluctuation in output of the pair of thermopile sensors.

7. The passenger detection apparatus according to claim 3, wherein the passenger and the baggage are distinguished depending on fluctuation in output of the pair of thermopile sensors.

* * * * *